United States Patent [19]

Ellsworth

[11] Patent Number: 5,123,466
[45] Date of Patent: Jun. 23, 1992

[54] DECORATIVE PANEL AND METHOD OF MANUFACTURE

[76] Inventor: John Ellsworth, 4 Warlock St., New Britain, Conn. 06051

[21] Appl. No.: 565,635

[22] Filed: Aug. 10, 1990

[51] Int. Cl.⁵ .......................... B27M 3/00; B23C 1/20
[52] U.S. Cl. ..................... 144/372; 144/134 D; 144/144 R; 144/371; 144/37; 409/130; 409/137
[58] Field of Search ............. 409/125, 130, 137, 182; 144/134 D, 136 C, 144 R, 144 S, 371, 372, 37

[56] References Cited

U.S. PATENT DOCUMENTS 4,215,731  8/1980  Maynard .................. 144/134 D
4,735,531  4/1988  Boerckel et al. ........... 144/134 D Primary Examiner—W. Donald Bray
Attorney, Agent, or Firm—Robert S. Smith

[57] ABSTRACT

An article of manufacture that simulates the appearance of a louvered member has a planar face having a plurality of generally rectangular recesses therein, each of the recesses has first and second opposed sides and third and fourth opposed sides, and the depth of each recess is greater along the second side than along the first side. The depth of the second side of each of the recesses is substantially identical. The invention also includes the method of manufacture a simulated louvered member which includes providing a workpiece having a first planar face; providing first and second rails and positioning the first and second rails on opposed sides of the workpiece, providing a plurality of reference points along the rails that are disposed in predetermined alignment with each other; providing a fixture dimensioned and configured for engaging the reference points at a plurality of substantially uniformly spaced positions along the rails; and providing apparatus on the fixture for holding a router. Another form of the invention includes the apparatus for manufacturing the simulated louver member.

8 Claims, 3 Drawing Sheets

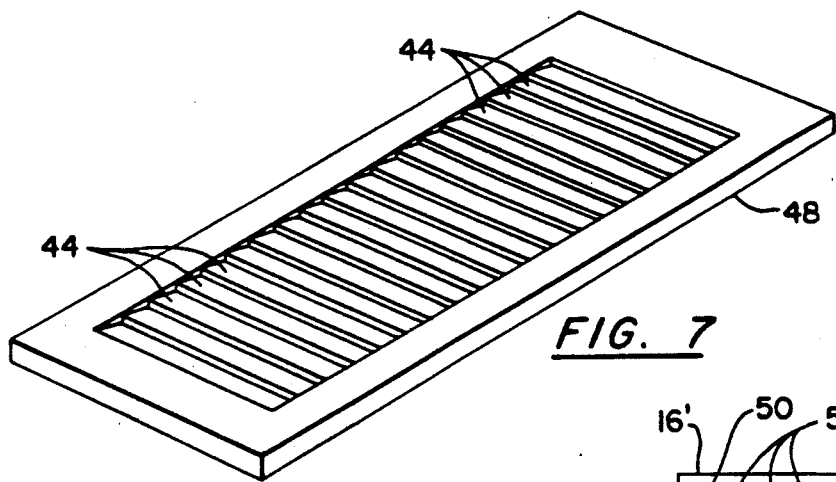
FIG. 7
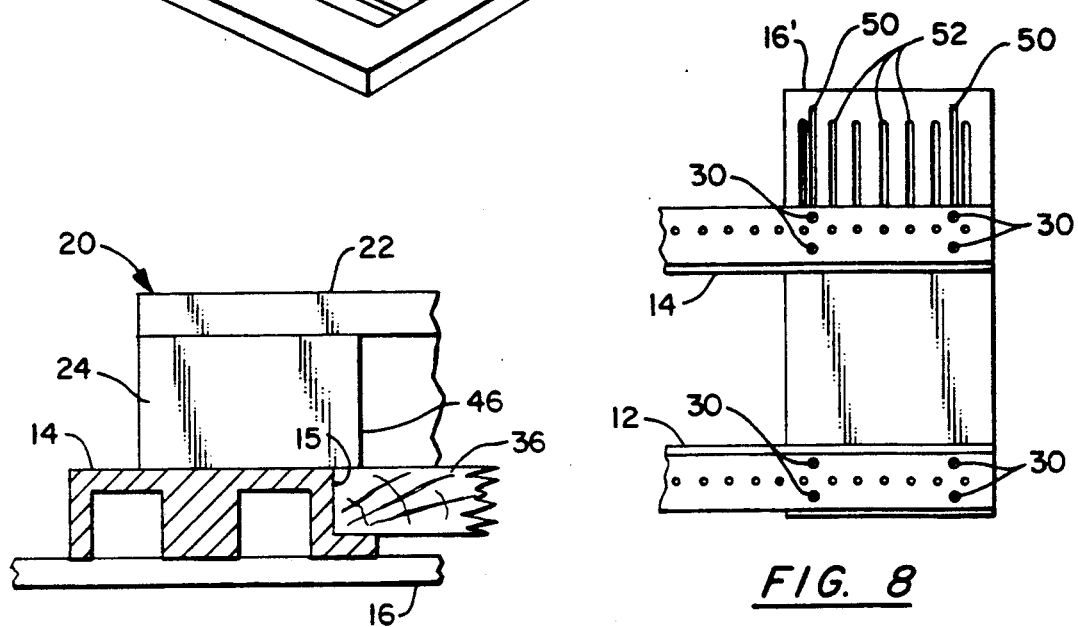
FIG. 6
FIG. 8
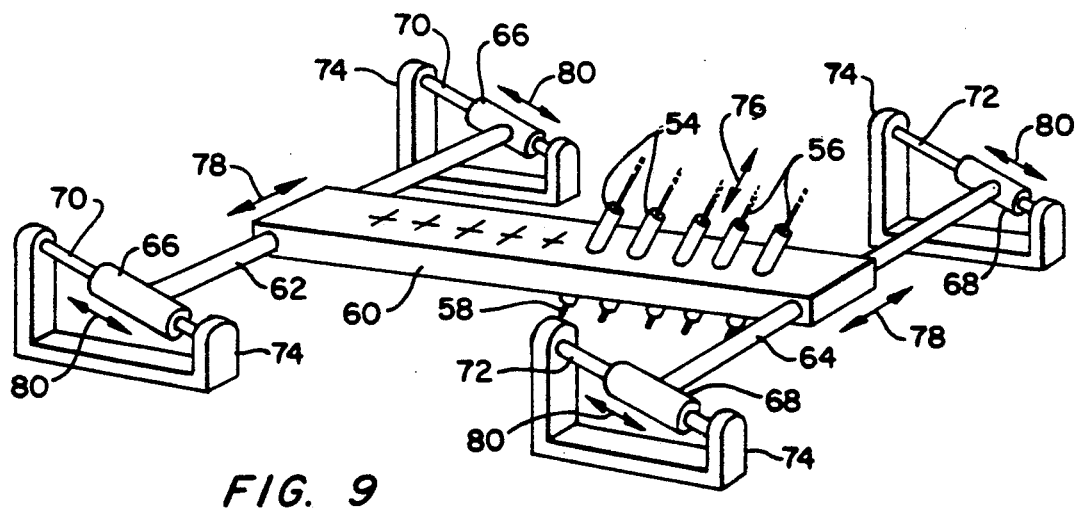
FIG. 9

DECORATIVE PANEL AND METHOD OF MANUFACTURE

RELATED APPLICATIONS

This application is related to application Ser. No. 07/236,717 filed Aug. 28, 1988, now abandonded.

BACKGROUND OF THE INVENTION

This invention relates to decorative panels, (such as those used in doors, shutters, privacy screens, or room dividers), and more specifically to such panels that use louvers or elements that appear to be louvers as a decorative feature.

The prior art includes the following U.S. patents:
U.S. Pat. No. 1,798,540 Kelly
U.S. Pat. No. 3,468,058 La Fontaine
U.S. Pat. No. Des. 197,174 Filley, Jr.
U.S. Pat. No. Des. 245,263 Andresen
U.S. Pat. No. Des. 246,385 Bogan
U.S. Pat. No. 3,287,854 Dasovic
U.S. Pat. No. 3,305,992 Steed
U.S. Pat. No. 3,782,051 Quinf
U.S. Pat. No. 4,097,100 Sauder
U.S. Pat. No. 1,545,212 Stowe Both Kelly and La Fontaine show a construction that utilizes pivoted louvers, either of wood or glass. The present invention does not use louvers, as such, but produces a surface on a wood panel that has the appearance of louvers.

Andresen glues or or otherwise secures relatively thin, flat wood pieces to a door panel to produce a decorative effect.

Bogan uses a pattern of vertical and horizontal slats secured within a surrounding frame to produce a decorative grille.

Filley shows an ornamental design for a small housing unit, (probably for use as a cabana or dressing room), whose doors appear to be fitted with louvers. There is no detail given, but considering the size and probable use of the unit it would be judged that the louvers were of the conventional type, so as to provide some measure of ventilation.

The other references are of only general interest. Several merely show the use of molded plastic elements which are inherently inferior in aesthetic appeal.

In general, the conventional louvered panel construction, even with fixed louvers, is time consuming, requiring the mounting of many separate louver slats within a frame. A pivoted louver arrangement is even more complex. Due to the nature of the assembly required, if a louver slat is broken, usually the entire assembly must be replaced.

It is an object of this invention to provide a means for routing the surface of a solid wood panel to produce the visual effect of a louvered opening, without the need for a multitude of separate parts and the related assembly procedures.

Another object of this invention is to provide a routing fixture that will accommodate a wide range of panel widths and lengths.

A further object is to describe a system to permit rapid production of the decorative panels to minimize manufacturing costs.

Other objects and advantages of the present invention will readily occur to one skilled in the art to which the invention pertains upon reference to the following detailed description.

SUMMARY OF THE INVENTION

It has now been found that these an other objects of the invention may be obtained in an article of manufacture which includes a member having a first planar face, at least the first planar face has a plurality of generally rectangular recesses therein, each of the recesses has first and second opposed sides and third and fourth opposed sides, and the depth of each recess is greater along the second side than along the first side.

In some forms of the invention the article of manufacture is constructed with the depth of the second side of each of the recesses being substantially identical. The third sides of each of the recesses may be disposed in substantially mutually aligned relationship. The fourth sides of each of the recesses may all be disposed in substantially mutually aligned relationship. Each of the third and fourth sides of each of the recesses may be substantially identical in length.

The invention also includes apparatus for manufacturing, with an associated router having an output shaft cooperating with a router bit and a workpiece having a planar face, to form a simulated louver member which has a plurality of recesses formed in a planar face, each of the recesses being generally rectangular and having opposed first and second sides and the second side has a depth greater than the first side and the recesses also have opposed third and fourth sides which includes first and second spaced apart rails, the rails being spaced apart a distance which is greater than the dimension of the associated workpiece to allow positioning of the workpiece intermediate the rails; means for defining a plurality of reference points along each of the rails, the reference points are disposed in predetermined relationship; a fixture is dimensioned and configured with means for engaging the reference points on the rails in a plurality of discrete positions, the fixture includes an opening therein, the opening is dimensioned and configured for receiving the output shaft of the associated router and to thereby define the limits of possible travel of the router and thus the dimensions and depth of a recess which is to be cut in the associated workpiece.

BRIEF DESCRIPTION OF THE DRAWING

FIG. 6 is a section view taken along lines 6—6 in FIG. 5.

FIG. 7 is a perspective view of the finished decorative panel produced in the fixture.

FIG. 8 is a plan view of a portion of the fixture showing another embodiment.

FIG. 9 is a schematic perspective view of a system to provide high speed production of the decorative panel.

DESCRIPTION OF THE PREFERRED EMBODIMENT

Figure 1:
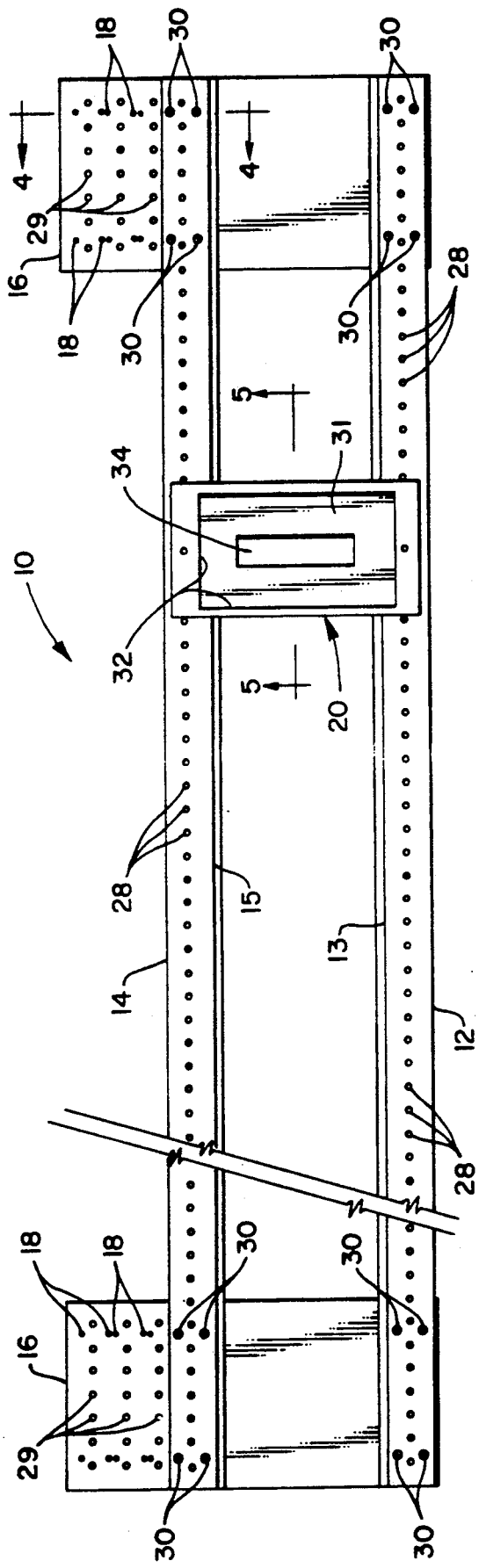
FIG. 1 is a plan view of a routing fixture made in accordance with this invention.
Figure 3:
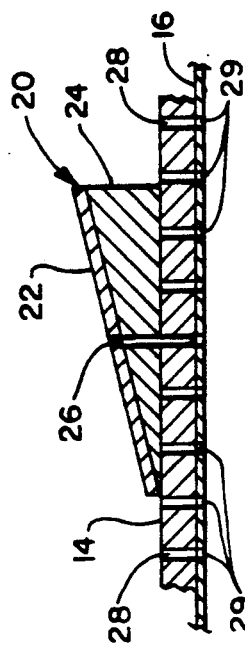
FIG. 3 is a section view taken along lines 3—3 in FIG. 2.
Figure 2:
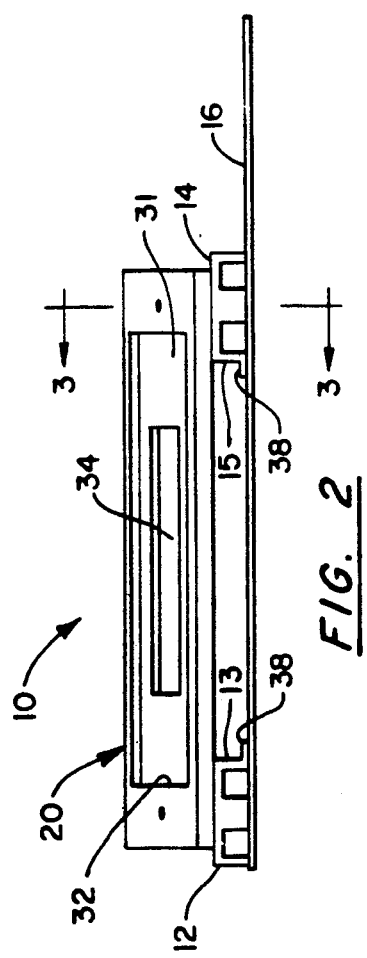
FIG. 2 is a right end view of the routing fixture shown in FIG. 1.
Figure 4:
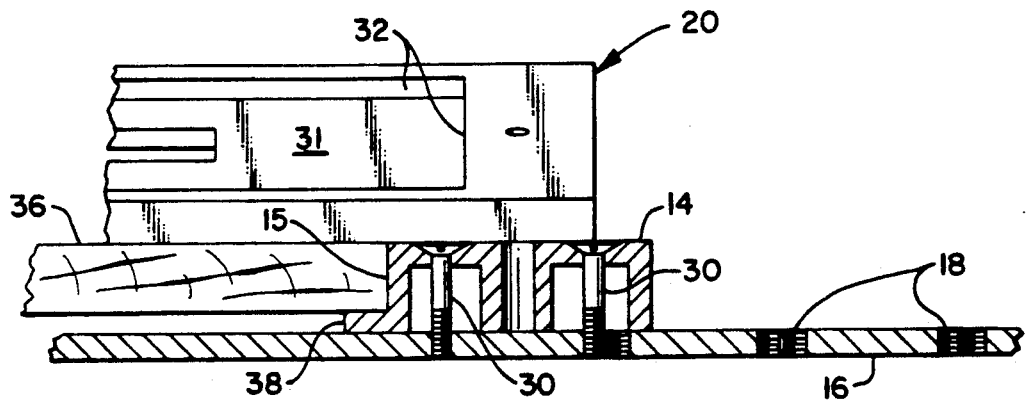
FIG. 4 is a section view taken along lines 4—4 in FIG. 1.
Figure 5:
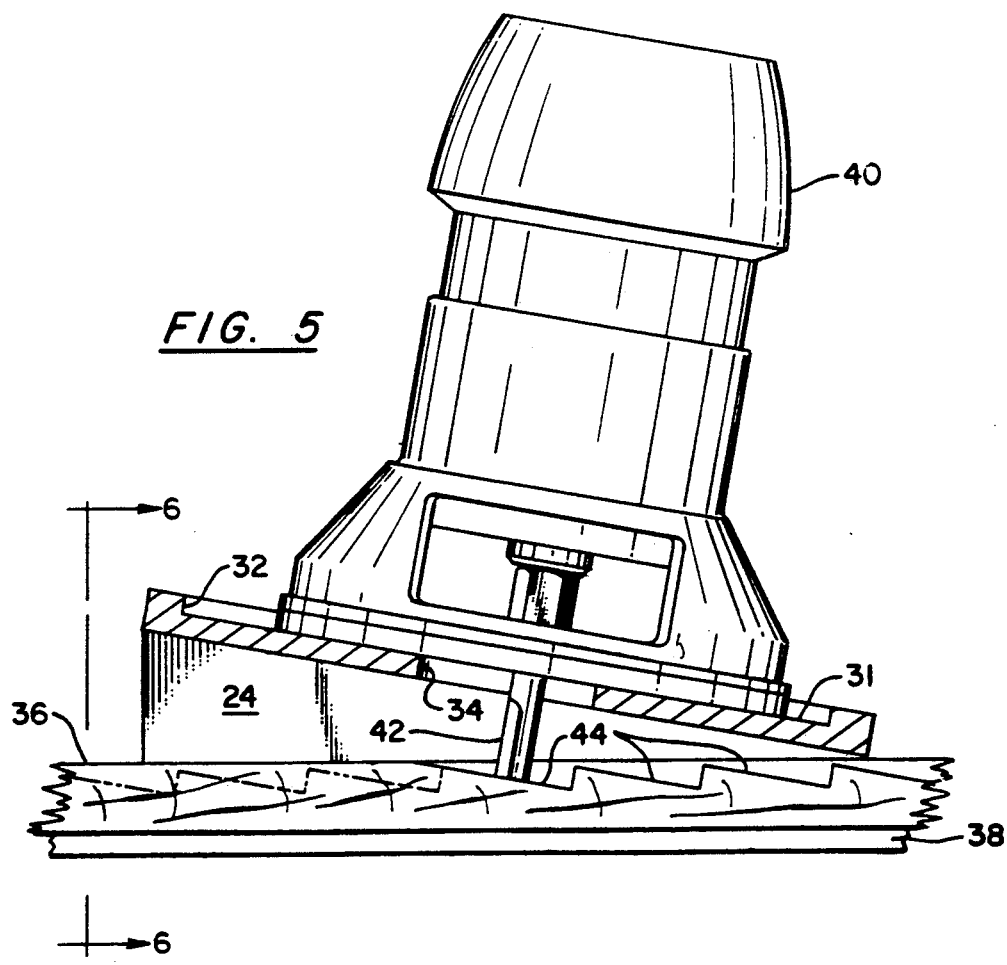
FIG. 5 is a section view taken along lines 5—5 in FIG. 1.

Referring now to the drawings, a routing fixture 10 is shown which comprises a fixed rail 12, an adjustable rail 14, two mounting plates 16, and a router guide assembly 20.

The rails 12 and 14 are secured to the mounting plates 16 by means of bolts 30 threading into tapped holes 18. The distance between the rails 12 and 14 determine the width of the panel that can be inserted into the fixture. As shown in FIG. 1, the adjustable rail 14 is mounted in the position closest to the rail 12, which corresponds to the narrowest panel that can be worked on. Additional pairs of tapped holes 18 are provided on the mounting plates 16 to allow the adjustable rail 14 to be moved away from the fixed rail 12 and be secured in any of three other locations, providing for three larger panel sizes that can be accommodated. Holes 29 are provided in mounting plates 16 which align with holes 28 in the rail 14. This prevents buildup of dust or chips in the holes 28 that might interfere with proper entry of locating pins 26, as described below.

Spanning the distance between the two rails 12 and 14 is the router guide assembly 20, consisting of a plate 22, supports 24, and locating pins 26. The locating pins 26 are fixed in the supports 24 by set screws or an interference fit. The locating pins 26 protrude below the lower surface of the supports 24 and serve to locate the guide assembly 20 at discrete locations along the rails 12, 14 by fitting into the holes 28 in the top surface of the rails 12, 14.

The plate 22 contains a recessed surface 31 upon which the router 40 rests while being used. The vertical surface 32 around the perimeter of the surface 31 is the actual template and determines the extent of the movement of the router 40. The plate 23 is supported at an angle to the horizontal by the supports 24. This angle is somewhat arbitrary, but it has been found that ten degrees produces a pleasing appearance in the finished product. An opening 34 is provided in the central portion of the plate 22 to clear the router cutter 42.

To set up to produce a desired decorative panel a workpiece 36 is trimmed to a width that fits closely between surface 15 of the rail 14 and surface 13 of the rail 12, then inserted between those surfaces and allowed to lie on two flanges 38 which are a part of the rails 12, 14. In this position the top surface of the workpiece 36 will be flush with the top surface of each rail 12, 14. The guide assembly 20 is then positioned near one end of the fixture by engaging locating pins 26 in a suitable set of locating holes 28. It is then determined by measurement where the workpiece 36 should be located so that the initial routing cut is correctly located on its surface.

The workpiece 36 is then shifted to that location and secured in place with conventional C-clamps (not shown). As may be seen in FIG. 6, the inner surfaces 46 of the supports 24 overhang the surface 15 (and surface 13 on the opposite side), thereby also serving to hold the workpiece 36 in place.

The router 40, with its depth of cut predetermined, is now turned on, placed on the surface 31, and operated within the limits of the template surface 32 to to produce an angled step surface 44. The guide assembly is relocated to the adjacent pair of locating holes 28 and the routing operation is repeated. This relocation and routing routine is repeated until the required number of angled steps 44 have been produced. FIG. 7 shows a typical finished panel 48.

FIG. 8 illustrates another embodiment which shows mounting plate 16' utilizing slots 50 in place of tapped holes 18. By using nuts on the bolts 30, the adjustable rail 14 may be secured at any location along the slots 50 and not be restricted to any predetermined location. Within the range of the slots 50, this arrangement permits an infinite number of panel width selections. Holes 29 in mounting plate 16 are replaced by slots 52, which perform the same function as holes 29.

FIG. 9 illustrates schematically a system using multiple routing cutters where the entire complement of angled steps could be cut at one time. Spindle housings 54, each containing spindles 56 and routing cutters 58, are mounted at the desired angle in support 60 and are driven by a common drive (not shown). Depth of cut is selected by an axial adjustment indicated by arrow 76. The support 60 is provided with a crosswise movement (arrow 78) by sliding on cross rods 62, 64. The support/cross rod combination is provided a sloping movement by virtue of the bushings 66, 68 affixed to the extremities of the cross rods 62, 64. Bushings 66, 68 slide on sloped rods 70, 72, which are mounted on supports 74 to obtain a motion indicated by arrows 80.

Although this invention has been described with reference to the attached drawing, it will be obvious that various changes and modifications may be made without departing from the spirit of the invention. Therefore, the details of the invention are to be limited only by the scope of the appended claims.

Having thus described my invention I claim:

1. Apparatus for manufacturing with an associated router having an output shaft cooperating with a router bit and a workpiece having a planar face to form a simulated louver member which has a plurality of recesses formed in a planar face, each of the recesses being generally rectangular and having opposed first and second sides and the second side has a depth greater than the first side and the recesses also have opposed third and fourth sides which comprises:
   first and second spaced apart rails, said rails being spaced apart a distance which is greater than the dimension of the associated workpiece to allow positioning of the workpiece intermediate said rails;
   means for defining a plurality of reference points along each of said rails, said reference points being disposed in predetermined relationship;
   a fixture dimensioned and configured with means for engaging said reference points on said rails in a plurality of discrete positions, said fixture including an opening therein, said opening being dimensioned and configured for receiving the output shaft of the associated router and to thereby define the limits of possible travel of the router and thus the dimensions and depth of a recess which is to be cut in the associated workpiece;
   means for moving said fixture in a first direction.

2. A method of manufacture a simulated louvered member which comprises:
   providing a workpiece having a first planar face;
   providing first and second rails and providing on each a plurality of reference points thereon, positioning the first and second rails on opposed sides of said workpiece, positioning the reference points on each of said rails in alignment with each other;

providing a fixture dimensioned and configured for engaging at least one of said reference points on each of said rails at a plurality of axially spaced points along said rails and positioning said fixture sequentially on successive reference points; and providing means on the fixture for guiding a router, positioning a router on said means for guiding a router and routing an elongated slot with the router in each position of said fixture.

3. The method of manufacture as described in claim 2 wherein:

the step of providing successive points along each of said rails are substantially equally spaced.

4. The method of manufacture as described in claim 3 wherein:

the step of providing a fixture includes providing a fixture for holding said router with the axis thereof in oblique relationship to said first face of the workpiece.

5. The method of manufacture as described in claim 4 wherein:

said step of providing a fixture includes providing a fixture having a generally rectangular recess dimensioned and configured for limiting movement of the router to define the size of the recess being cut in the workpiece.

6. A method of manufacturing a simulated louvered member which has a plurality of recesses formed in a planar face, each of said recesses being generally rectangular and having opposed first and second sides and the second side has a depth greater than the first side, said recesses also having opposed third and fourth sides, which comprises:

providing a planar member;

providing a fixture carrying a plurality of router bits for rotation, with the router bits disposed with the axes thereof in coplanar relationship and positioning the fixture above the planar member, moving all of the router bits substantially simultaneously into cutting engagement with the planar member; and providing means for guiding the fixture in a direction which is in a plane which is substantially perpendicular to the first and second sides of each of said recesses and sequentially moving the means for guiding to successive positions.

7. The method of manufacture as described in claim 6 wherein:

the method further includes providing elongated bushings mounting the fixture, and positioning the bushings in oblique relationship to the first face.

8. The method of manufacture as described in claim 7 further including:

providing the fixture with a plurality of router cutters mounted for rotation and providing a plurality of drive means for the respective router cutters and providing each of the router cutters with an axis and all of the axes of the respective router cutters in coplanar relationship.

* * * * *